US010198411B2

(12) United States Patent
Keslin et al.

(10) Patent No.: US 10,198,411 B2
(45) Date of Patent: Feb. 5, 2019

(54) STORING ADDITIONAL DOCUMENT INFORMATION THROUGH CHANGE TRACKING

(71) Applicant: MICROSOFT TECHNOLOGY LICENSING, LLC, Redmond, WA (US)

(72) Inventors: Michelle Keslin, Kirkland, WA (US); Daniel Snyder, Redmond, WA (US); Ali Taleghani, Redmond, WA (US); Jitesh Sachdeva, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 708 days.

(21) Appl. No.: 14/844,687

(22) Filed: Sep. 3, 2015

(65) Prior Publication Data

US 2016/0321227 A1 Nov. 3, 2016

Related U.S. Application Data

(60) Provisional application No. 62/155,700, filed on May 1, 2015.

(51) Int. Cl.
*G06F 17/24* (2006.01)
*G06F 3/0484* (2013.01)
*G06F 17/22* (2006.01)
*G06Q 10/10* (2012.01)

(52) U.S. Cl.
CPC .......... *G06F 17/24* (2013.01); *G06F 3/04842* (2013.01); *G06F 17/2288* (2013.01); *G06Q 10/101* (2013.01)

(58) Field of Classification Search
CPC .... G06F 3/0484; G06F 17/24; G06F 3/04842; G06F 17/2288; G06Q 10/101
See application file for complete search history.

(56) References Cited

U.S. PATENT DOCUMENTS

| 7,698,421 B2 | 4/2010 | Bernard et al. |
| 8,073,811 B2 | 12/2011 | Strathearn et al. |
| 8,707,187 B2 | 4/2014 | Zhou |

(Continued)

OTHER PUBLICATIONS

"International Preliminary Report on Patentability Issued in PCT Application No. PCT/US2016/029905", dated Jun. 22, 2017, 7 Pages.

"Word Track Changes and Co-Authoring in Real Time", Published on: Jan. 28, 2014 Available at: http://ask.metafilter.com/256108/Word-Track-Changes-and-co-authoring-in-real-time.

(Continued)

*Primary Examiner* — William L Bashore
*Assistant Examiner* — Gregory A Distefano

(57) ABSTRACT

Additional document information may be stored through change tracking. In some examples, an application, such as a document processing application, may allow collaborative creation and/or editing of a document. As individual collaborators enter new content or make changes to existing content, the new content and/or changes go through two phases. As an individual collaborator is editing, the change is temporary. The collaborator may decide not to integrate it to the document. The temporary content may become permanent or integrated through a save action (manual or automatic). In some examples, the temporary content may be shared with other collaborators through a scheme to indicate its status as temporary giving the collaborators a true collaboration experience.

19 Claims, 7 Drawing Sheets

(56) References Cited

U.S. PATENT DOCUMENTS

| | | | |
|---|---|---|---|
| 8,739,021 B2 | 5/2014 | Yuniardi | |
| 2003/0112273 A1* | 6/2003 | Hadfield | G06Q 10/10 715/751 |
| 2004/0205653 A1* | 10/2004 | Hadfield | G06Q 10/10 715/255 |
| 2010/0257457 A1* | 10/2010 | De Goes | G06Q 10/10 715/751 |
| 2012/0101980 A1 | 4/2012 | Taleghani et al. | |
| 2012/0150942 A1 | 6/2012 | Alev et al. | |
| 2012/0192055 A1 | 7/2012 | Antebi et al. | |
| 2013/0124956 A1 | 5/2013 | Hatfield et al. | |
| 2013/0151940 A1* | 6/2013 | Bailor | G06F 17/24 715/229 |
| 2013/0205246 A1* | 8/2013 | Schmidt | G06F 3/0484 715/781 |
| 2013/0246901 A1 | 9/2013 | Massand | |
| 2013/0262373 A1 | 10/2013 | Rampson | |
| 2013/0326330 A1* | 12/2013 | Harris | G06F 17/2288 715/234 |
| 2014/0032489 A1 | 1/2014 | Hebbar et al. | |
| 2014/0215302 A1 | 7/2014 | Little et al. | |
| 2014/0289645 A1 | 9/2014 | Megiddo et al. | |
| 2014/0310345 A1 | 10/2014 | Megiddo et al. | |
| 2014/0359481 A1 | 12/2014 | Dawson et al. | |
| 2015/0052135 A1 | 2/2015 | Calkowski et al. | |

OTHER PUBLICATIONS

Edmonds, Rich, "OneDrive to Introduce New Folder Co-Owner Feature alongside Rebranding", Published on: Feb. 9, 2014 Available at: http://www.windowscentral.com/onedrive-bring-new-folder-co-owners-alongside-rebranding.

Campbell, Alex, "Google Docs: How to use Suggested Edits and 2 other Great Editing Features", Published on: Jul. 22, 2014 Available at: http://www.pcworld.com/article/2456460/google-docs-3-incredibly-useful-tools-for-edits-and-revisions.html.

Zheng, et al., "Co-Authoring with Structured Annotations", In Proceedings of Computer Human Interaction, Apr. 22, 2006, 10 pages.

Arias, Nuno, "Why Office 365 is the Best Choice for Collaboration?", Published on: Feb. 12, 2014 Available at: http://www.nuno-silva.net/Blog/Post/375/Why-Office-365-is-the-best-choice-for-collaboration.

"Second Written Opinion Issued in PCT Application No. PCT/US2016/029905", dated Mar. 7, 2017, 6 Pages.

"International Search Report and Written Opinion Issued in PCT Application No. PCT/US2016/029905", dated Jul. 26, 2016, 12 Pages.

Li, et al., "A New Paradigm of User Intention Preservation in Real Time Collaborative Editing Systems", In Proceedings of Seventh International Conference On Parallel And Distributed Systems, Jul. 4, 2000, pp. 401-408.

* cited by examiner

STORING ADDITIONAL DOCUMENT INFORMATION THROUGH CHANGE TRACKING

CROSS-REFERENCE TO RELATED APPLICATION

This Application claims the benefit under 35 U.S.C. § 119(e) of U.S. Provisional Patent Application Ser. No. 62/155,700 filed on May 1, 2015. The disclosure of the U.S. Provisional Patent Application is hereby incorporated by reference in its entirety.

BACKGROUND

Productivity applications, such as word-processing applications, spreadsheet applications, presentation applications, and notebook applications, among other examples, may enable two or more editors to create, edit, and share content. In some examples, two or more editors may utilize traditional document collaboration and may share a document via an email attachment. The two or more editors may maintain separate copies of the document or may periodically consolidate copies of the document, which may result in a degraded user experience. Maintaining versions and edits from the two or more users may foe difficult and time-consuming.

In other scenarios, the productivity application may be executed in a collaborative environment. The collaborative environment may allow the two or more editors to co-author the document to more efficiently edit and share the updated content among one another. Through use of co-authoring, the two or more editors may use change tracking to store temporary comments and/or temporary edits in the document. However, when one of the editors saves the document, the temporary comments and/or the temporary edits performed by change tracking may not be distinguished from original document content.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to storing additional document information through change tracking. In some examples, collaborators may be enabled to edit a document. A content change may be detected in the document and an indication associated with the detected content change may be received from one of the collaborators performing the content change. A content change type may be identified based on the indication. The content change type may include a temporary type or a committed type. The content change and the content change type may foe presented to the collaborators. The content change with the temporary type may be presented through a channel that is distinct from another channel used to present the content change with the committed type.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
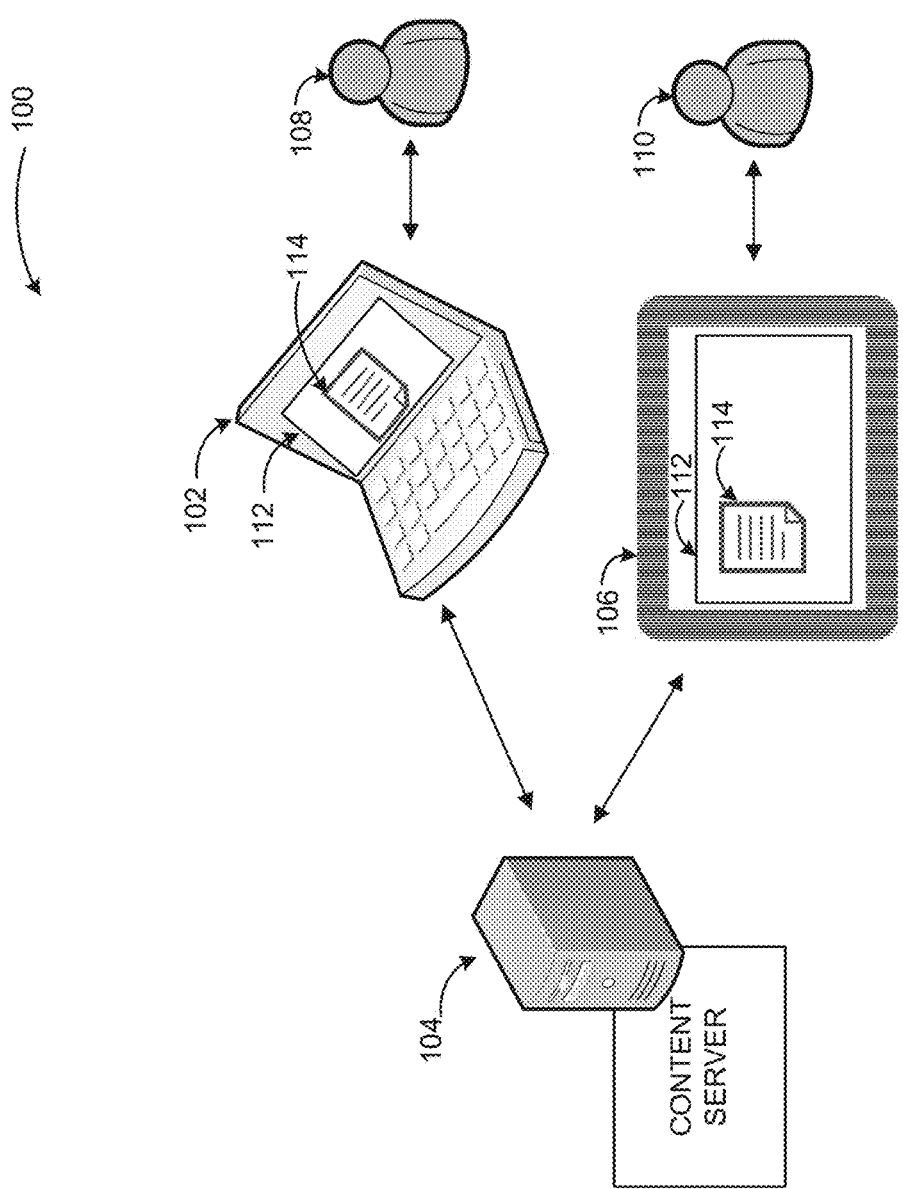
FIG. 1 is a conceptual diagram illustrating an example of storing additional document information through change tracking, according to embodiments.

As briefly described above, additional document information may be stored through change tracking. In some examples, an application, such as a document processing application, may allow collaborative creation and/or editing of a document. As individual collaborators enter new content or make changes to existing content, the new content and/or changes go through two phases. As an individual collaborator is editing, the change is temporary. The collaborator may decide not to integrate it to the document. The temporary content may become permanent or integrated through a save action (manual or automatic). In some examples, the temporary content may be shared with other collaborators through a scheme to indicate its status as temporary, giving the collaborators a true collaboration experience.

Summary information such as a collaborator's identity (e.g., user name), the change, and/or timing of the change, among others may be presented locally at a location of the change or in a combined manner through a separate pane or pop-up user interface on or in association with the displayed document. A separate channel may be used to exchange temporary content changes from the channel used for exchanging integrated changes. Document metadata (e.g., at the server) may be used to store the temporary content changes.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to store additional document information through change tracking. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which an editor interacts with the application or service. A user action refers to an interaction between the editor and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and sendees managed by separate entities.

FIG. 1 is a conceptual diagram illustrating an example of storing additional document information through change tracking, according to embodiments.

As shown in a diagram 100, computing devices 102, 106 may execute a document processing application 112. The document processing application 112 may be a productivity application, such as a word-processing application, a presentation application, a spreadsheet application, or a notebook application, among other examples. The computing devices 102, 106 may include a display device, such as a touch enabled display component, and a monitor, among others, to provide the document processing application 112 to a first editor 108 and a second editor 110, respectively. The computing devices 102, 106 may include a desktop computer, a laptop computer, a tablet, a smart phone, and a wearable computer, among other similar computing devices, for example.

The document processing application 112 may be executed in a collaborative environment to enable the first editor 108 and the second editor 110 to co-author a document 114 by creating, editing, and/or sharing content of the document 114 over a network, such as a cloud. The content may include structured data or streaming data associated with audio, video, graphics, images, and/or text.

In some examples, the document processing application 112 may be executed on a content server 104. The content server 104 may include a web server or a document server, among others. The computing devices 102, 106 may communicate with the content server 104 through the network. The network may provide wired or wireless communications between nodes, such as the computing devices 102, 106 or the content server 104. In other examples, the document processing application 112 may be provided by one of a third party service, web applications, and a datacenter, among others. In an example, the document 114 may be retrieved from a content service hosted by the content server 104.

For example, the document processing application 112 may allow the first editor 108 to create a section of the document 114 by performing an insertion of the content into the document 114. The insertion of content may not interfere with modifications performed on the document 114 by the second editor 110. Next, the document processing application 112 may detect a save operation performed on the document 114. In response to the detection of the save operation, the document processing application 112 may notify the second editor 110 of the modifications performed by the first editor 108. The document processing application 112 may allow the second editor 110 to refresh the document 114 to view the edits. The document processing application 112 may also allow the second editor 110 to continue editing the document 114 and refresh the document 114.

The document processing application 112 may also be configured to allow the first editor 108 to invite the second editor 110 to view the content of the document 114. For example, the document processing application 112 may be configured to provide a control element through a user interface (UI) of the display device. The control element may allow the first editor 108 to select the second editor 110 to invite to view the content of the document 114.

While the example system in FIG. 1 has been described with specific components including the computing devices 102, 106, the content server 104, and the document processing application 112, embodiments are not limited to these components or system configurations and can be implemented with other system configuration employing fewer or additional components.

Figure 2:
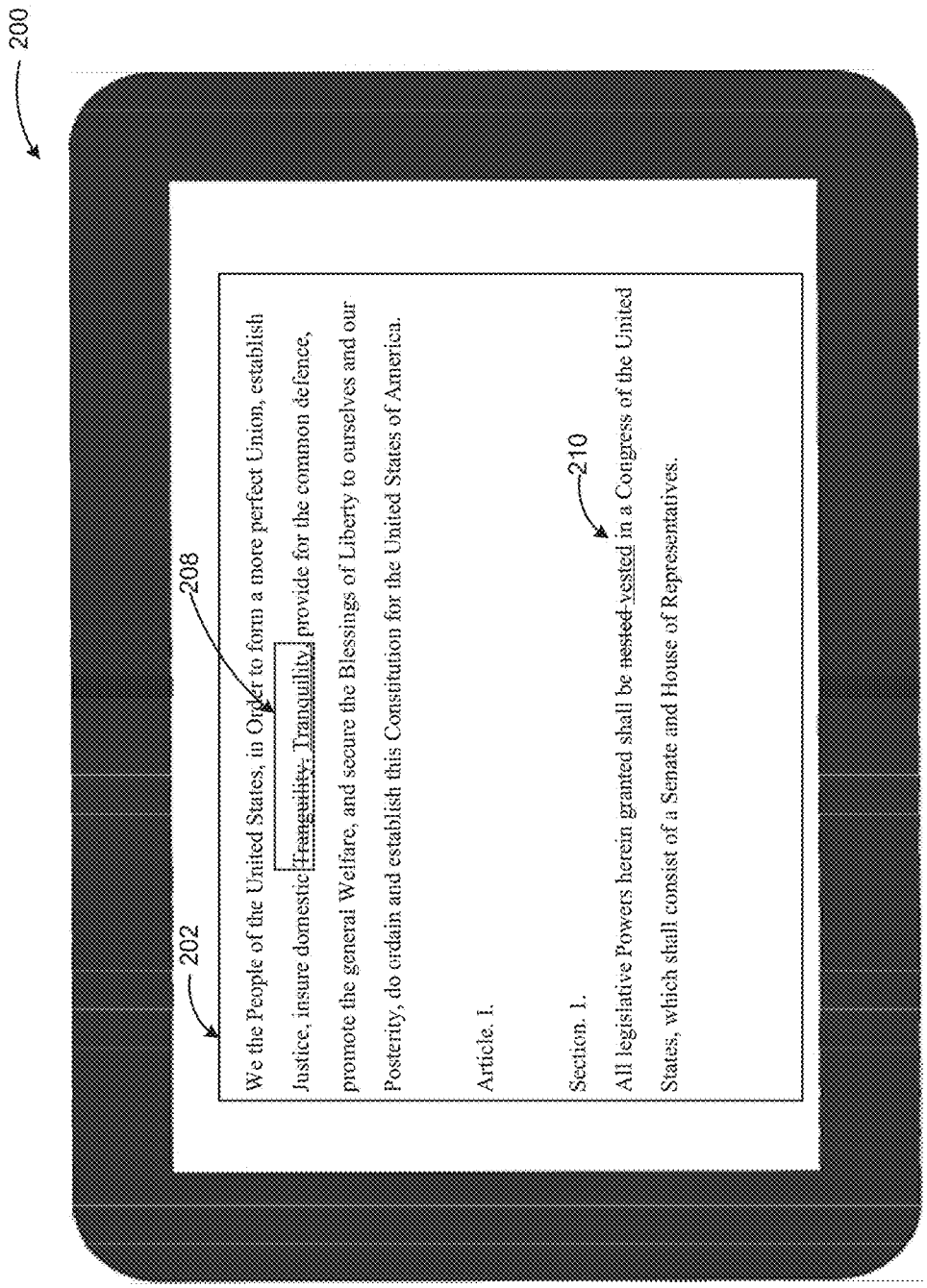
FIG. 2 is a display diagram illustrating an example of a document processing application that stores additional document information through change tracking, according to embodiments.

FIG. 2 is a display diagram illustrating an example of a document processing application that stores additional document information through change tracking, according to embodiments.

In a diagram 200, a collaborated document is displayed on a tablet computer through a user interface of a document processing application 202. Two example changes 208 and 210 are shown in standard mark-up format, where a word has been deleted and replaced with another word. The first change 208 may be a temporary change made by one of the collaborators, but not saved. Thus, the change may be a temporary content change. The collaborator (or editor) may yet decide to forgo that change. The second change 210 may be a permanent change, where the collaborator may have indicated his/her acceptance of the change through a manual save action, or the change may have been saved through an automatic save action. The acceptance here is different from conventional acceptance of tracked changes, where the change becomes part of the content and no longer visible. In this case, the change is still shown such that all collaborators can see it, but the editing collaborator is no longer thinking about it (i.e., has decided to commit to the change).

To indicate the difference between the two changes, the first change 208 is presented with a visual indicator to distinguish it from the second, permanent change 210; in this case, a rectangle around the first change. Thus, other collaborators may infer from the rectangle that the editing collaborators has not made a final decision on that particular change. The rectangle is an example of a graphical scheme that may be used to identify temporary content changes. Other schemes such as textual, color, highlighting, and/or shading schemes may also be used. By allowing collaborators to see content changes that each collaborator is working on as they happen (i.e., real-time or quasi-real-time), the collaboration experience may be enhanced. On the other hand, temporary content changes that a collaborator decides not to keep may be easily reverted.

In some examples, the temporary content change information may be exchanged over a separate channel from a channel used to exchange integrated changes (i.e., changes made through a save action). The temporary content change channel may be implemented for faster exchange of information such that changes are shown closer to real time without overburdening a network capacity. Another result of visual indication of temporary content changes may be allowing the collaborators to filter in or out the temporary content changes. Thus, a collaborating editor may select to not display the temporary content changes (and not be distracted by them) or may select to display the temporary content changes only to understand the thinking process by his/her collaborators. The temporary content changes may be saved (temporarily) as part of the metadata associated with the document.

Figure 3:
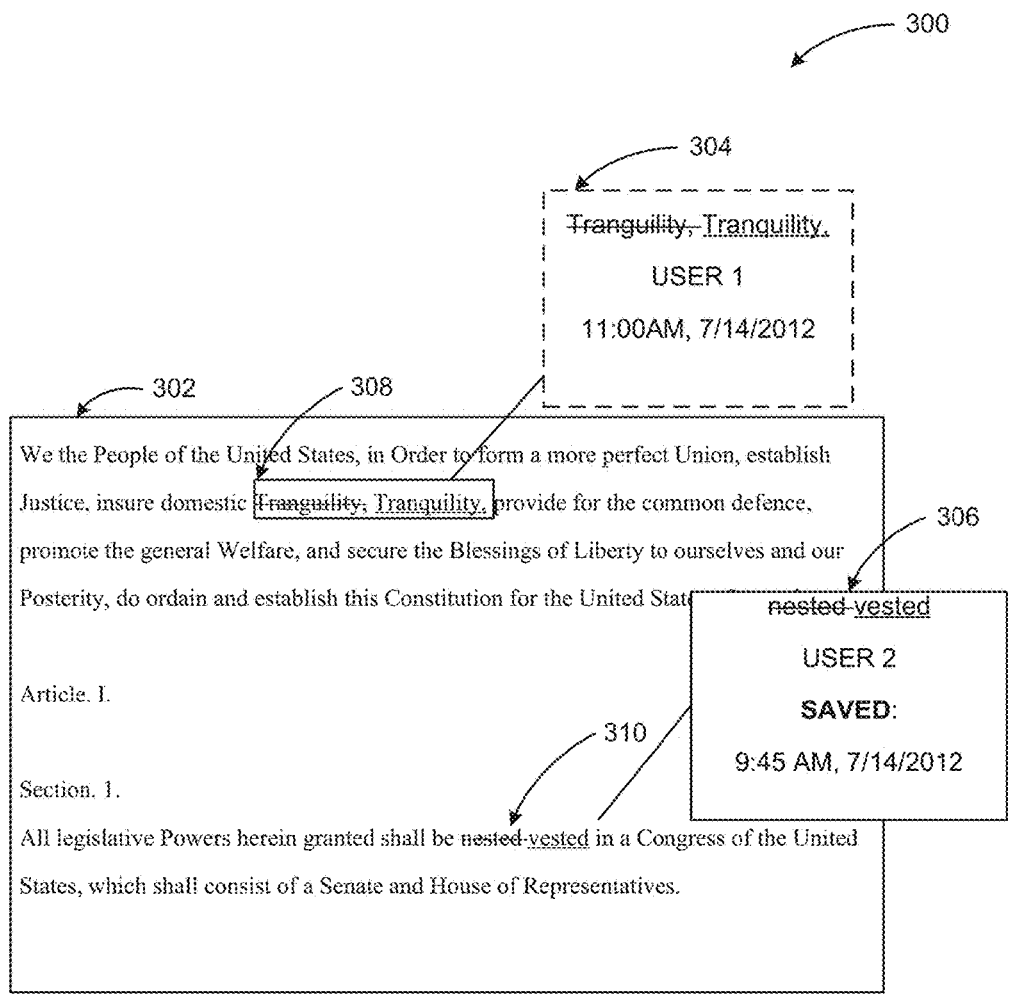
FIG. 3 is a display diagram illustrating an example of a document processing application that stores additional information associated with temporary content of a document through change tracking, according to embodiments.

FIG. 3 is a display diagram illustrating an example of a document processing application that stores additional information associated with temporary content of a document through change tracking, according to embodiments.

In a diagram 300, user interface 302 of the document processing application displays the tracked changes by collaborators) displaying additional information to a user (e.g., another collaborator). Temporary content change 308 is a change that has not been committed by its editor yet. Content change 310 is a change that has been committed by its editor through a save action, for example. Differently from FIG. 2, in FIG. 3, a comment box 304 displays the particular content change, who made the change, and when it was made. As in diagram 200, the temporary content change is indicated by the rectangle surrounding it. As a further emphasis of its temporary nature, the comment box may be surrounded by dashed lines.

Comment box 306 with continuous lines presents the content change 310, the collaborator who made the change, and when it was "saved." Thus, the comment box 306 indicates that the change has been saved by the collaborator and, thereby, committed. As mentioned previously, the temporary content changes may be saved (temporarily) in the metadata associated with the document. The metadata may include audio data, textual data, and/or image data, among other examples. The metadata may include the change, as well as the collaborator who made the change, time and/or date of the change, and/or any other pertinent information.

In addition to the graphical elements (e.g., rectangle, dashing of the comment box lines), temporary and permanent content changes may be distinguished from each other through a textual scheme, a graphical scheme, an audio scheme, a comment box, an animation scheme, a coloring scheme, a highlighting scheme, and/or a shading scheme, among other methods. The comment boxes or similar indicators may be displayed automatically or in response to a user action such as selecting a particular change or hovering over a particular change in-line.

Furthermore, content changes are not limited to the examples shown herein. Embodiments may be implemented with any form of content change including, but not limited to, insertion of new content, removal of content, formatting change, style change, and/or comparable ones. Moreover, content is not limited to textual content. Other types of content, including, but not limited to, images, graphics, video content, and/or audio content may also be tracked and temporary changes distinguished from permanent or committed changes using the principles discussed herein.

Figure 4A:
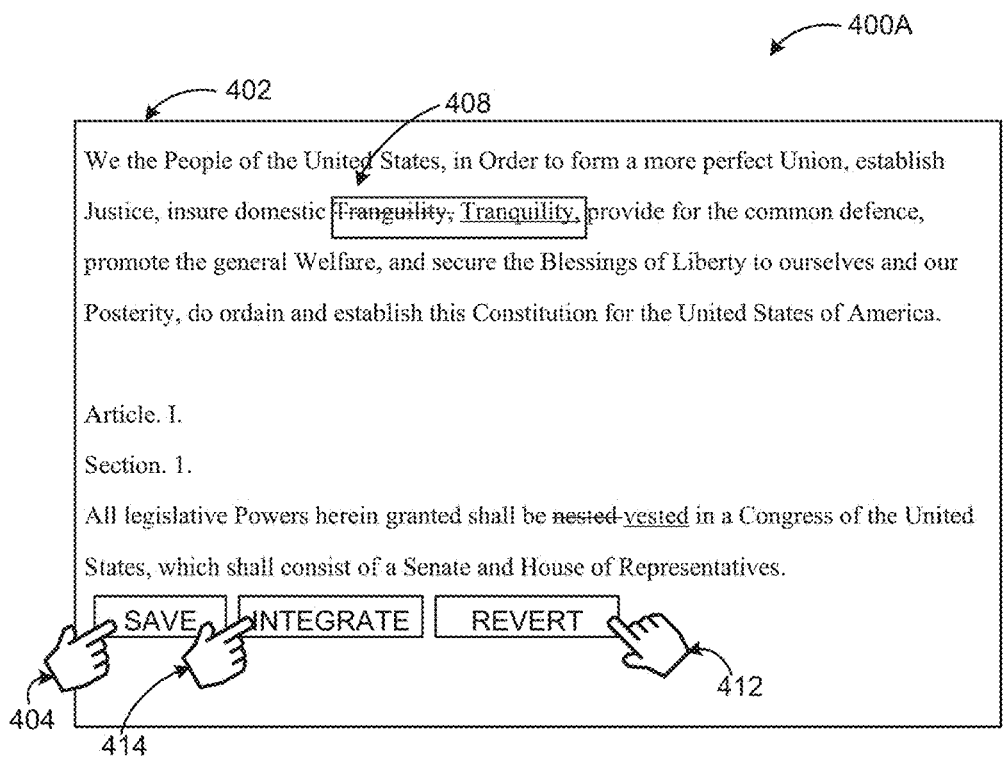
FIGS. 4A and 4B are display diagrams illustrating performance of a save operation on a document to save a section in the document and save information associated with temporary content as metadata of the document, according to embodiments.
Figure 4B:
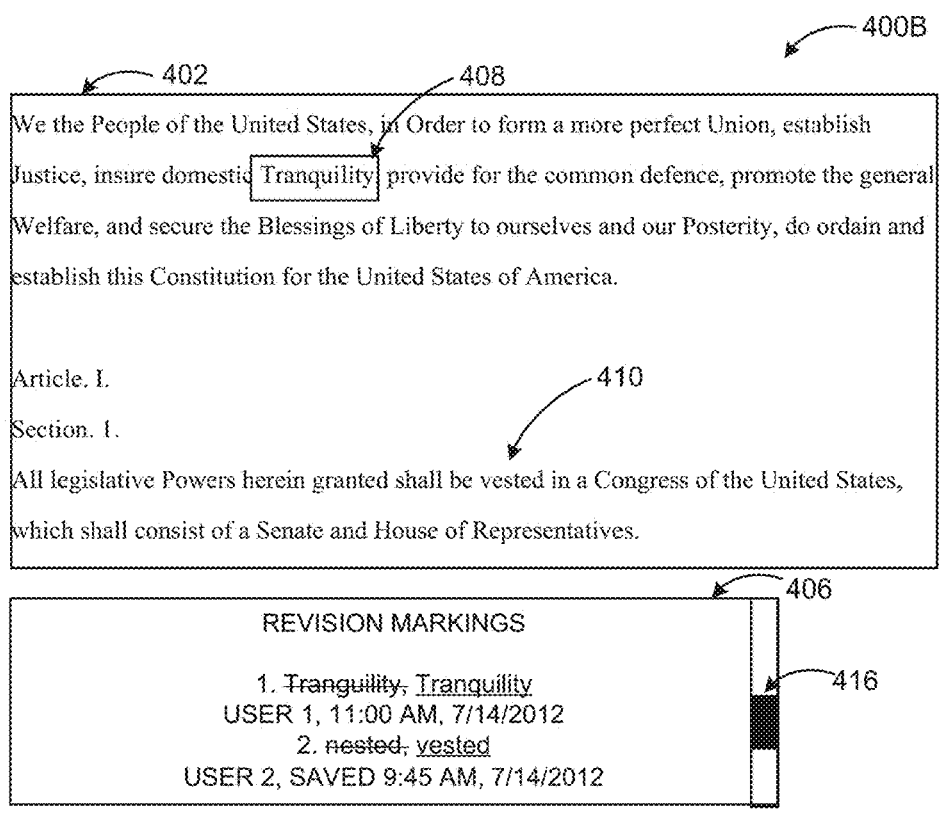

FIGS. 4A and 4B are display diagrams illustrating a performance of a save operation on a document to save the document and save information associated with temporary content as metadata of the document, according to embodiments.

In a diagram 400A of FIG. 4A, user interface 402 of the document processing application displays the two different types of content changes, a temporary content change 408 and permanent content change 410. In addition, the user interface 402 includes controls to commit or revert the temporary content change. For example, a "save" control 404 may save the document as is, thereby converting all temporary content changes (not just the temporary content change 408) to permanent content changes. An "integrate" control 414 may convert a selected temporary content change (e.g., the temporary content change 408) to a permanent content change. A "revert" control 412 may allow the editor to reject the selected temporary content change. A "revert all" control (not shown) may allow the editor to revert all temporary content changes since a prior save or integration. One of ordinary skill in the art will appreciate that additional or alternative controls may be presented.

These controls are to be distinguished from standard change acceptance and rejection controls, which integrate any changes or remove them from the document content such that the changes cannot be seen as tracked changes any more.

Diagram 400B of FIG. 4B shows another example of change tracking presentation with a distinction between temporary and permanent changes. User interface 402 of the document processing application displays the temporary content change 408 and permanent content change 410. Another user interface 406, which may be activated by selection of a change view control, for example, may provide summary information associated with the changes, similar to the comment boxes in FIG. 3. The temporary content changes may be distinguished from the committed content changes through a variety of schemes such as the textual scheme shown in the user interface 406, where the committed changes are indicated as "SAVED." Other schemes such as textual, color, highlighting, and/or shading schemes may also be used. A scroll bar 416 may allow a user to scroll through all changes in the document, whether in synchronization with the user interface 402 or independently from the user interface 402. The user interface 406 may be displayed adjacent to the user interface 402, partially overlapping with the user interface 402, and/or in other configurations.

As discussed above, the document processing application may be employed to store additional document information through change tracking. Document collaboration through productivity applications, as described in the embodiments herein, may enable the collaborating editors to access and edit the content of the document. The content may be provided to all editors through a single application. Accordingly, enabling access to the content may increase editor efficiency, which may further promote collaboration among the editors. Further, use of co-authoring when editing and/or creating the document may increase efficiency in network usage and/or reduce communication traffic. Moreover, co-authoring as described herein may reduce data storage demand as multiple copies of the document at differing stages of an editing process may be reduced.

Embodiments, as described herein, address a need that arises from a lack of efficiency between collaborators interacting with a document processing or other application of the computing device. The actions/operations described herein are not a mere use of a computer, but address results of a system that are a direct consequence of software used as a service offered in conjunction with large numbers of editors and applications.

The example scenarios and schemas in FIG. 1 through FIG. 4B are shown with specific components, data types, and configurations. Embodiments are not limited to systems according to these example configurations. Storing additional document information through change tracking may be implemented in configurations employing fewer or additional components in applications and user interfaces. While example embodiments are described in the context of a document processing application, one of ordinary skill in the art will appreciate that the techniques described herein may be used in the context of other applications, including spreadsheet, slideshow, note-taking, productivity, and a variety of other applications. Furthermore, the example schema, and components shown in FIG. 1 through FIG. 4B and their subcomponents may be implemented in a similar manner with other values using the principles described herein.

Figure 5:
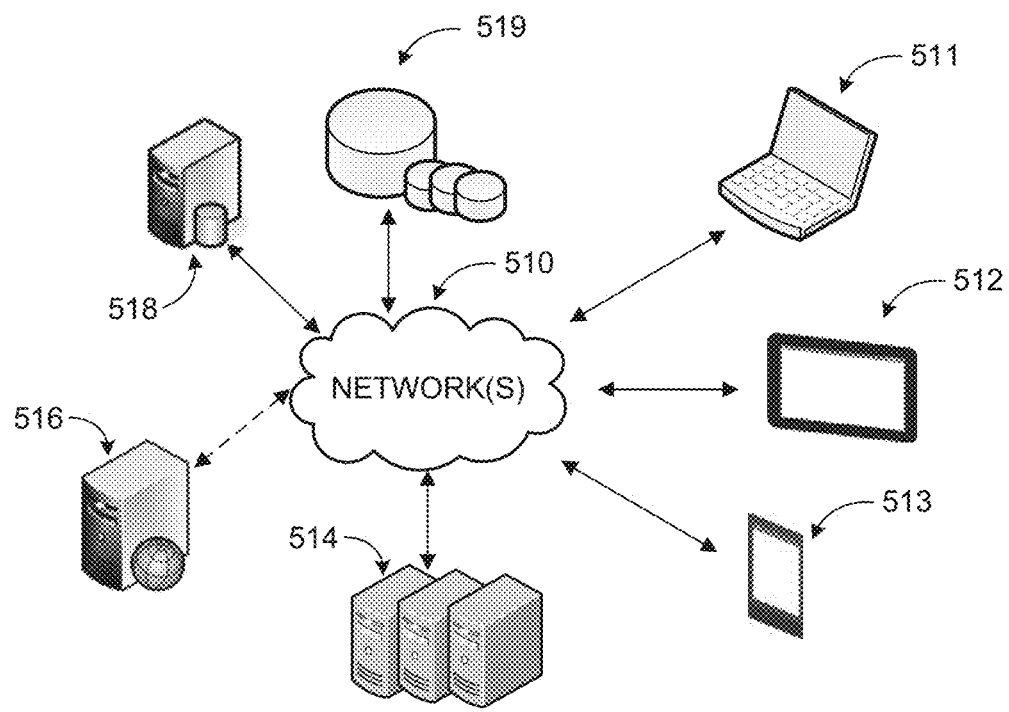
FIG. 5 is a simplified networked environment, where a system according to embodiments may be implemented.

FIG. 5 is an example networked environment, where a system according to embodiments may be implemented.

A document processing application configured to store additional document information through change tracking may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via applications) executed by servers 514, or on individual server 516. An application, such as a document processing application, may allow collaborative creation and/or editing of a document. As individual collaborators enter new content or make changes to existing content, the new content and/or changes go through two phases. As an individual collaborator is editing, the change is temporary. The collaborator may decide not to integrate it into the document. The temporary content may become permanent or integrated through a save action (manual or automatic). In some examples, the temporary content may be shared with other collaborators through a scheme to indicate its status as temporary giving the collaborators a true collaboration experience. The document processing application may store data associated with the document in data store(s) 519 directly or through database server 518.

Network(s) 510 may comprise any topology of servers, clients, Internet sendee providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing de vices, applications, data sources, and data distribution systems may be employed to store additional document information through change tracking. Furthermore, the networked environments discussed in FIG. 5 are for illustration purposes only. Embodiments are not limited to the example applications, modules, or processes.

Figure 6:
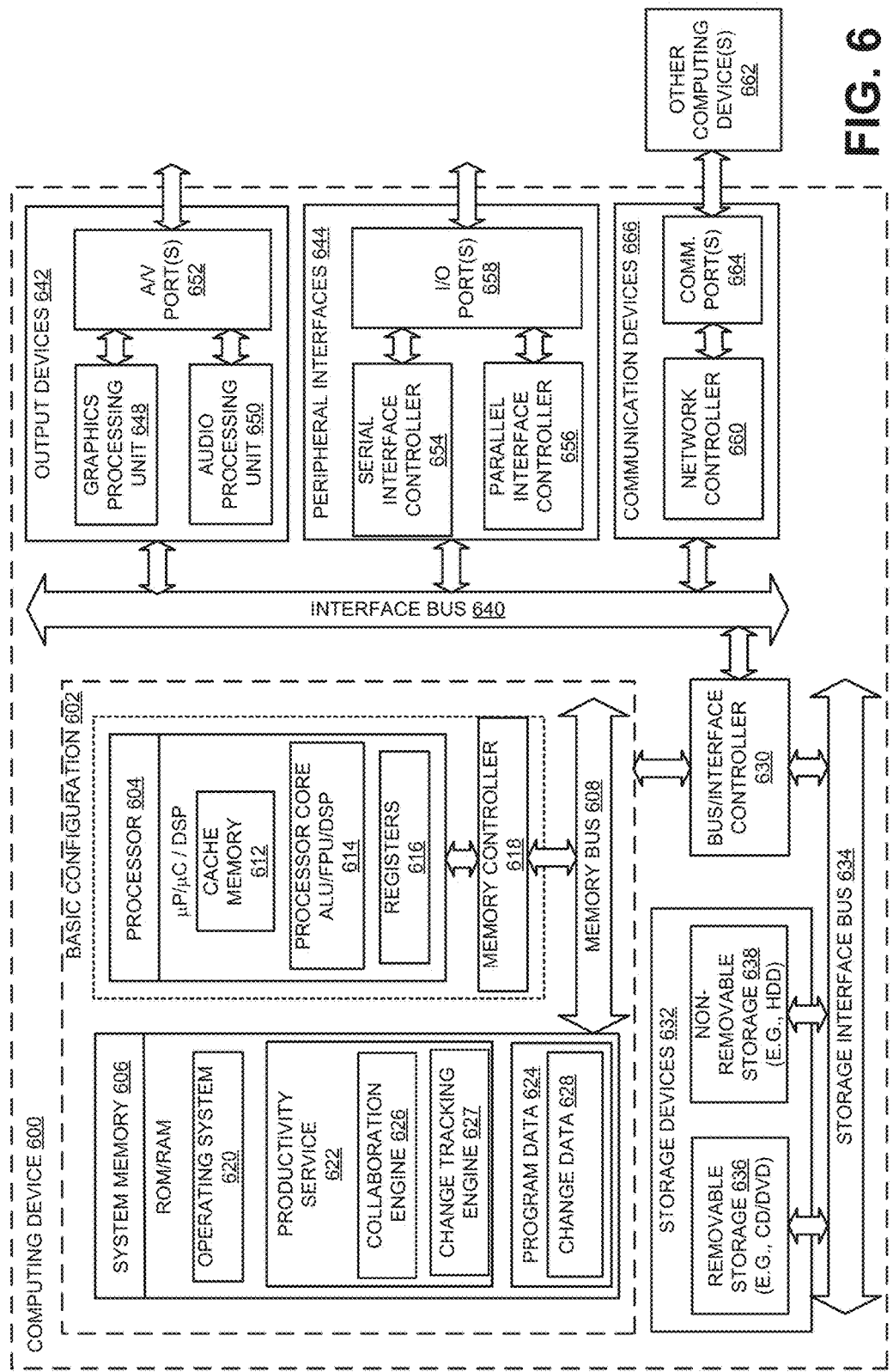
FIG. 6 is a block diagram of an example computing device, which may be used to store additional document information through change tracking.

FIG. 6 is a block diagram of an example computing device, which may be used to store additional document information through change tracking, according to at least some embodiments disclosed herein.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The example basic configuration 602 may be illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one more levels of caching, such as a level cache memory 612, one or more processor cores 614, and registers 616. The one or more processor cores 614 may (each) include an arithmetic logic unit (ALU), a floating point unit (FPU), a digital signal processing core (DSP Core), or any combination thereof. An example memory controller 618 may also be used with the processor 604, or in some implementations, the example memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a document processing application 622, and a program data 624, which may include change data 628. The document processing application 622 may include components, such as a collaboration engine 626 and a change tracking engine 627. The collaboration engine 626 and the change tracking engine 627 may execute the processes associated with the document processing application 622 in conjunction with storing additional document information through change tracking and distinguishing temporary content changes from committed content changes.

Components of the document processing application 622 (such as a user interface (UI)) may also be displayed on a display device associated with the computing device 600. An example of the display device may include a hardware screen that may be communicatively coupled to the computing device 600. The display device may include a touch based device that detects gestures such as a touch action. The display device may also provide feedback in response to detected gestures (or any other form of input) by transforming a user interface of the document processing application 622, displayed by the touch based device. The program data 624 may also include, among other data, change data 628, or the like, as described herein.

The computing device 600 may have additional features or functionality, and additional interfaces to facilitate communications between the example basic configuration 602 and any desired devices and interfaces. For example, a bus/interface controller 630 may be used to facilitate communications between the example basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the basic configuration 602 via the bus/interface controller 630. Some of the one or more output devices 642 include a graphics processing unit 648 and an audio processing unit 650, which may be configured to communicate to various external devices such as a display or speakers via one or more A/V ports 652. The one or more peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to store additional document information through change tracking. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
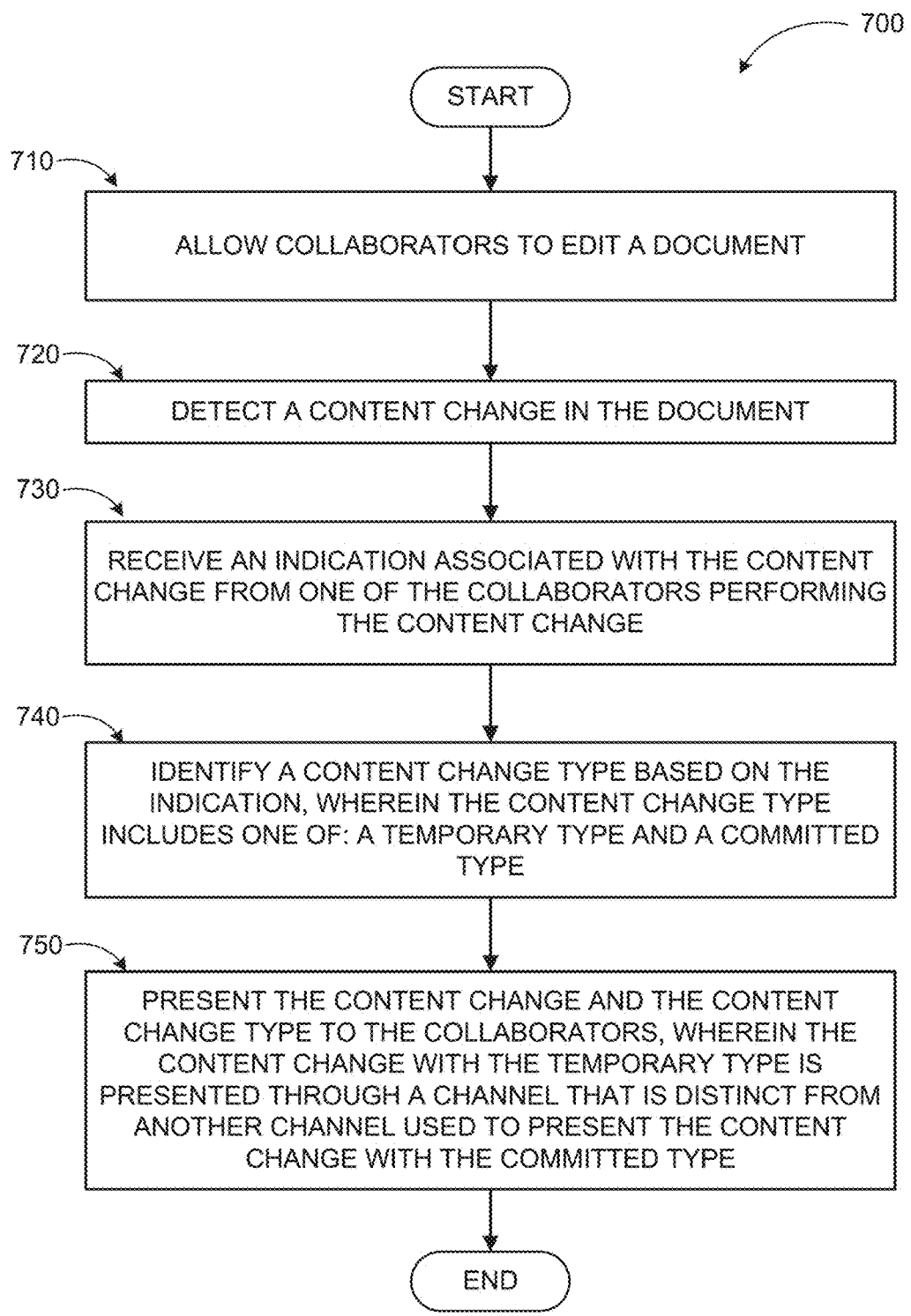
FIG. 7 is a logic flow diagram illustrating a process to store additional document information through change tracking, according to embodiments.

FIG. 7 is a logic flow diagram illustrating a process to store additional document information through change tracking, according to embodiments.

A process 700 may be implemented on a computing device, such as the computing device 600, or with another system. As described, an editor may be allowed to interact with a document processing application through an input device or a touch enabled display component of the computing device 600. The computing device 600 may include a display device to provide a user interface (UI) of the document processing application to the user.

The process 700 begins with operation 710, where the document processing application may allow collaborators to edit a document. In a typical scenario, an actual document may be maintained at a server with collaborators working on local copies (e.g., cached copies) of the same document. As each collaborator saves a current version of the document (through manual or automatic save), changes may be carried over to the version maintained at the server and forwarded to other collaborators. At operation 720, the document processing application may detect a content change in the document including, but not limited to, an insertion of new content, a removal of content, a formatting change, and/or a style change.

At operation 730, the document processing application may receive an indication associated with the content change from one the collaborators performing the content change. The indication may include a manual or automatic save action or lack thereof. At operation 740, the document processing application may identify a content change type based on the indication. The content change type may include a temporary type or a committed type. For example, a save action may indicate that the collaborator has committed to the change.

At operation 750, the document processing application may present the content change and the content change type of the content change to the collaborators. Content changes with the temporary type may be presented through a channel that is distinct from another channel used to present content changes with the committed type. The temporary content change channel may be a faster channel in some examples.

The operations included in process 700 are for illustration purposes. Storing additional document information through change tracking may be implemented by similar processes with fewer or additional steps, as well as in different order of operations using the principles described herein.

According to some examples, a computing device for storing additional document information through change tracking may be described. The computing device may include a memory configured to store instructions associated with a document processing application and one or more processors coupled to the memory. The one or more processors may execute the document processing application in conjunction with the instructions in the memory. The document processing application may include a collaboration engine. The collaboration engine may be configured to allow collaborators to edit a document and receive an indication associated with a content change from one of the collaborators performing the content change. The document processing application may also include a change tracking engine. The change tracking engine may be configured to detect the content change in the document, identify a content change type based on the indication, where the content change type includes one of: a temporary type and a committed type, and present the content change and the content change type to the collaborators, where the content change with the temporary type is presented through a channel that is distinct from another channel used to present the content change with the committed type.

According to other examples, the indication may include a manual save action by the collaborator, an automatic save action, or a lack of save action. The change tracking engine may be further configured to enable the content change to be filtered in the document based on the content change type to present the content change to the collaborators based on the content change type. The content change may be transmitted with the temporary type through the channel faster compared to the content change with the committed type through the other channel.

According to further examples, the change tracking engine may be further configured to save the content change with the temporary type in metadata associated with the document. The metadata may include audio data, textual data, or image data. The metadata may include an identity of the collaborator making the content change, a time of the content change, or a date of the content change. The change tracking engine may be further configured to present the content change with the temporary type using one or more or a textual scheme, a graphical scheme, an audio scheme, a comment box, an animation scheme, a coloring scheme, a highlighting scheme, and a shading scheme. The content change is associated with one or more of: a textual content, an image, a graphic, a video content, and an audio content According to some examples, a method for storing additional document information through change tracking may be described. The method may include allowing collaborators to edit a document, detecting a content change in the document, receiving an indication associated with the content change from one of the collaborators performing the content change, identifying a content change type based on the indication, where the content change type includes one of: a temporary type and a committed type, and presenting the content change and the content change type to the collaborators, where the content change with the temporary type is presented through a channel that is distinct from another channel used to present the content change with the committed type.

According to other examples, the method may further include presenting the content change through one or more or a textual scheme, a graphical scheme, an audio scheme, a comment box, an animation scheme, a coloring scheme, a highlighting scheme, and a shading scheme within a body of the document and presenting information associated with the content change through a comment box associated with the content change using one or more or a textual scheme, a graphical scheme, an audio scheme, a comment box, an animation scheme, a coloring scheme, a highlighting scheme, and a shading scheme within the comment box. The information associated with the content change may include one or more of an identity of one the collaborators performing the content change, a time of the content change, a date of the content change, and the content change type. The comment box may be presented in response to a selection of the content change.

According to further examples, the method may further include presenting information associated with the content change through a user interface distinct from another user interface that presents the document, where the user interface is differentiated from the other user interface with one or more or a textual scheme, a graphical scheme, an audio scheme, a comment box, an animation scheme, a coloring scheme, a highlighting scheme, and a shading scheme and providing one or more scroll controls on the user interface to perform a scroll operation through the content change.

According to some examples, a computer-readable memory device with instructions stored thereon for storing additional document information through change tracking may be described. The instructions may include actions that are similar to the method described above.

According to some examples a means for storing additional document information through change tracking may be described. The means for storing additional document information through change tracking may include a means to allow collaborators to edit a document, a means to detect a content change in the document, a means to receive an indication associated with the content change from one of the collaborators performing the content change, a means to identify a content change type based on the indication, where the content change type includes one of: a temporary type and a committed type, and a means to present the content change and the content change type to the collaborators, where the content change with the temporary type is presented through a channel that is distinct from another channel used to present the content change with the committed type.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device for storing additional document information through change tracking, the computing device comprising:
   a memory configured to store instructions associated with a document processing application;
   one or more processors coupled to the memory, the one or more processors executing the document processing application in conjunction with the instructions stored in the memory, wherein the one or more processors are configured to:
   detect a first content change and a second content change performed on a document by a collaborator associated with the document;
   identify the first content change as a temporary change based on a failure to detect a save operation associated with the first content;
   identify the second content change as a committed change based on a detection of a save operation associated with the second content change; and
   provide for display to one or more other collaborators associated with the document the first content change in a manner that is distinct from the second content change to distinguish the temporary change from the committed change, wherein the first content change is provided through a first channel and the second content change is provided through a second channel, and the first channel facilities faster provision of the temporary change to the one or more other collaborators compared to the second channel.

2. The computing device of claim 1, wherein the one or more processors are configured to:
   detect the first content change and the second content change by receiving an indication that includes one of: a manual save action by the collaborator, an automatic save action, and a lack of save action.

3. The computing device of claim 1, wherein the one or more processors are further configured to:
   enable the first content change and the second content change to be filtered in the document based on the identification of the first content change as the temporary change and the second content change as the committed change.

4. The computing device of claim 1, wherein the one or more processors are further configured to:
   save the first content change identified as the temporary change in metadata associated with the document.

5. The computing device of claim 4, wherein the metadata includes one or more of audio data, textual data, and image data.

6. The computing device of claim 4, wherein the metadata includes one or more of an identity of the collaborator, a time of the first content change, and a date of the first content change.

7. The computing device of claim 1, wherein the one or more processors are configured to:
   provide for display the first content change in the manner that is distinct from the second content change by using one or more of a textual scheme, a graphical scheme, an audio scheme, a comment box, an animation scheme, a coloring scheme, a highlighting scheme, and a shading scheme.

8. The computing device of claim 1, wherein the first content change and the second content change include one or more of an insertion of new content, a removal of existing content, a content change formatting, a content change style, and a document layout change.

9. The computing device of claim 1, wherein the first content change and the second content change are associated with one or more of: a textual content, an image, a graphic, a video content, and an audio content.

10. A method executed in a computing device for storing additional document information through change tracking, the method comprising:
    detecting a first content change and a second content change performed on a document by a collaborator associated with the document;
    identifying the first content change as a temporary change based on a failure to detect a save operation associated with the first content;
    identifying the second content change as a committed change based on a detection of a save operation associated with the second content change; and
    providing for display to one or more other collaborators associated with the document the first content change in a manner that is distinct from the second content change to distinguish the temporary change from the committed change, wherein the first content change is provided through a first channel and the second content change is provided through a second channel, and the first channel facilities faster provision of the temporary change to the one or more other collaborators compared to the second channel.

11. The method of claim 10, further comprising:
    providing for display the first content change in the manner that is distinct from the second content change using one or more or a textual scheme, a graphical scheme, an audio scheme, a comment box, an animation scheme, a coloring scheme, a highlighting scheme, and a shading scheme within a body of the document.

12. The method of claim 10, further comprising:
    providing for display information associated with the first content change through a first comment box associated with the first content change and information associated with the second content change through a second comment box associated with the second content change using one or more or a textual scheme, a graphical scheme, an audio scheme, an animation scheme, a coloring scheme, a highlighting scheme, and a shading scheme within the first comment box and the second comment box.

13. The method of claim 12, wherein the information associated with the first content change and the second content change includes one or more of an identity of the collaborator, a time of the first content change and the second content change, a date of the first content change and the second content change, and the identification of the first content change as the temporary change and of the second content change as the committed change.

14. The method of claim 12, further comprising:
providing for display the first comment box in response to a selection of the first content change and the second comment box in response to a selection of the second content change.

15. The method of claim 12, further comprising:
providing the information associated with the first content change and the second content change to be displayed through a user interface distinct from another user interface through which the document is displayed, wherein the user interface is differentiated from the other user interface with one or more or a textual scheme, a graphical scheme, an audio scheme, a comment box, an animation scheme, a coloring scheme, a highlighting scheme, and a shading scheme.

16. The method of claim 15, further comprising:
providing one or more scroll controls on the user interface to perform a scroll operation through the first content change and the second content change.

17. A computer-readable hardware memory device with instructions stored thereon for storing additional document information through change tracking, the instructions comprising:

detecting a first content change and a second content change performed on a document by a collaborator associated with the document;
identifying the first content change as a temporary change based on a failure to detect a save operation associated with the first content;
identifying the second content change as a committed change based on a detection of a save operation associated with the second content change; and
providing for display to one or more other collaborators associated with the document the first content change in a manner that is distinct from the second content change to distinguish the temporary change from the committed change, wherein the first content change is presented is provided through a first channel and the second content change is provided through a second channel, and the first channel facilities faster provision of the temporary change to the one or more other collaborators compared to the second channel.

18. The computer-readable hardware memory device of claim 17, wherein the instructions further comprise:
in response to a save action,
converting the first content change to a third content change identified as a committed change; and
in response to a revert action,
reverting the third content change identified as a committed change to the first content change.

19. The computer-readable hardware memory device of claim 17, wherein the instructions further comprise:
saving the first content change identified as the temporary change in metadata associated with the document, wherein the metadata includes one or more of: audio data, textual data, and image data; and
updating the metadata in response to receiving one of: a save action and a revert action from the collaborator.

\* \* \* \* \*